Oct. 16, 1923. 1,470,689
E. LOVER
CONVERTIBLE INCLOSURE FOR VEHICLES
Filed April 23, 1919 4 Sheets-Sheet 3
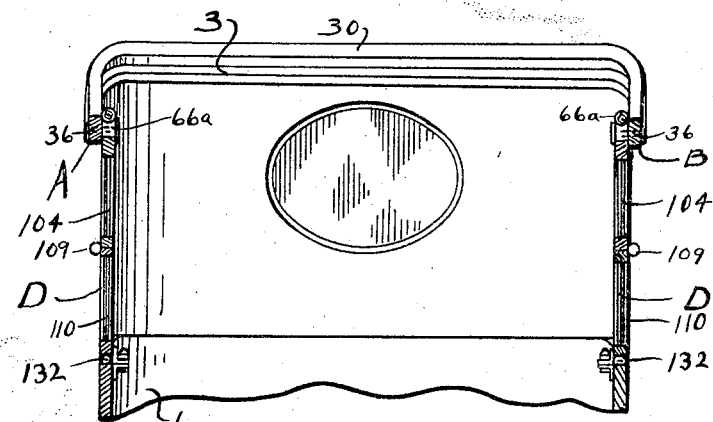
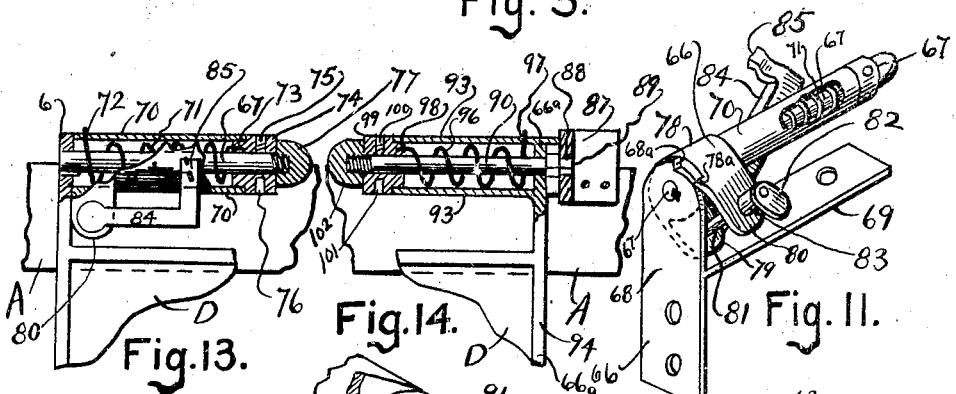
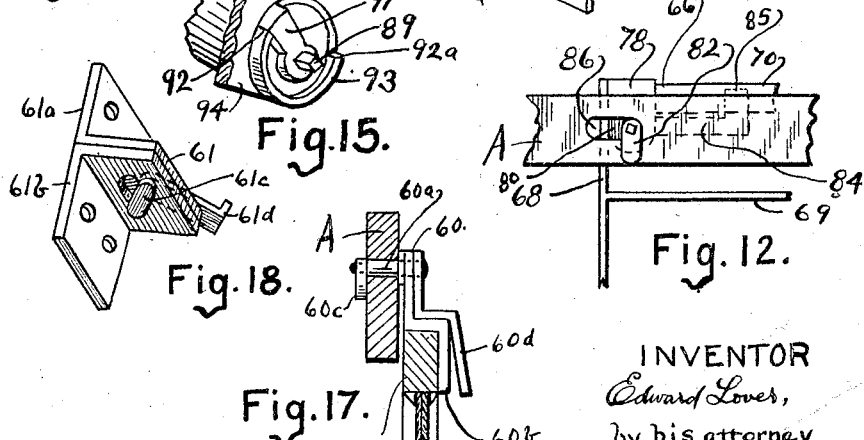
INVENTOR
Edward Lover,
by his attorney
J. Edward Thebaud

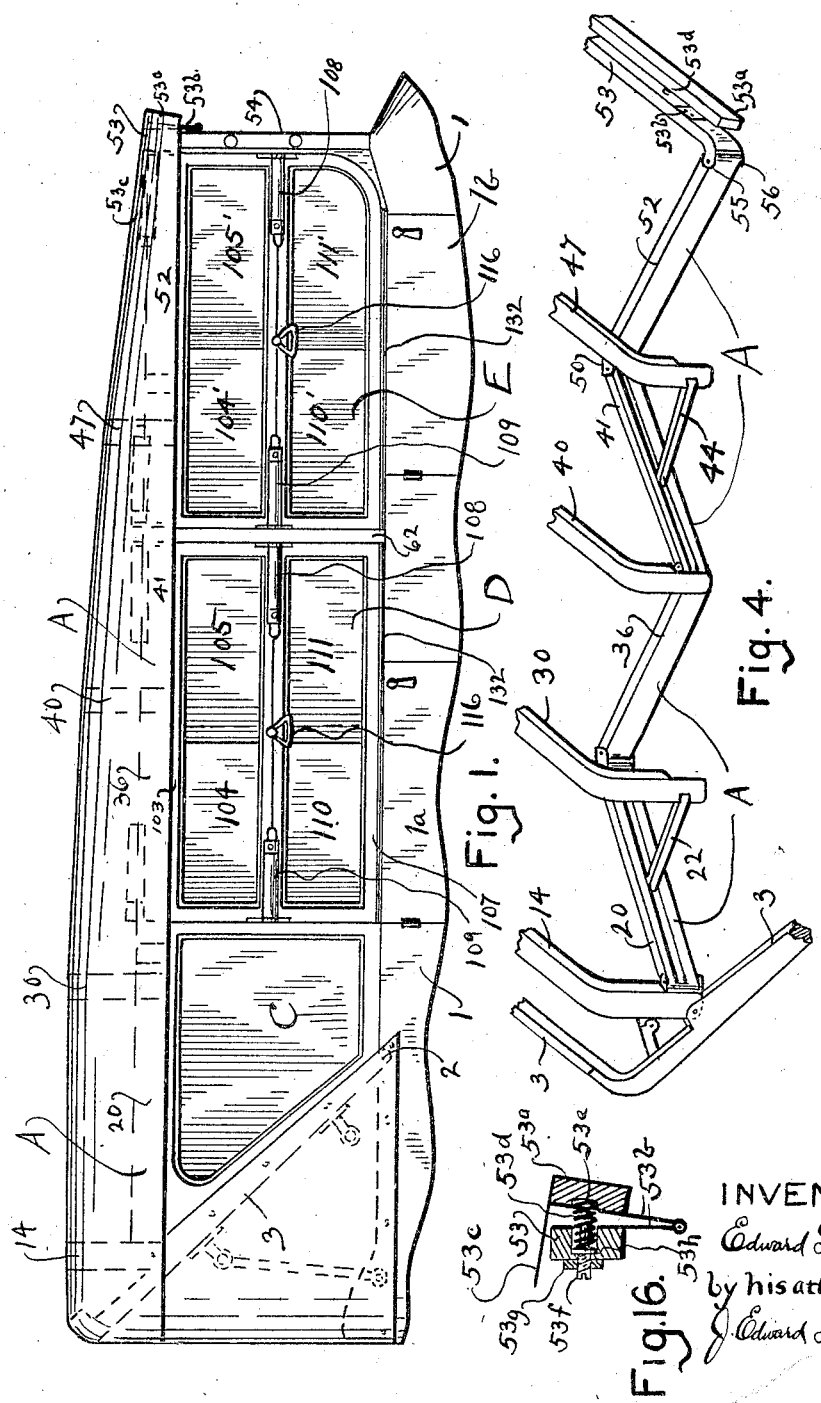

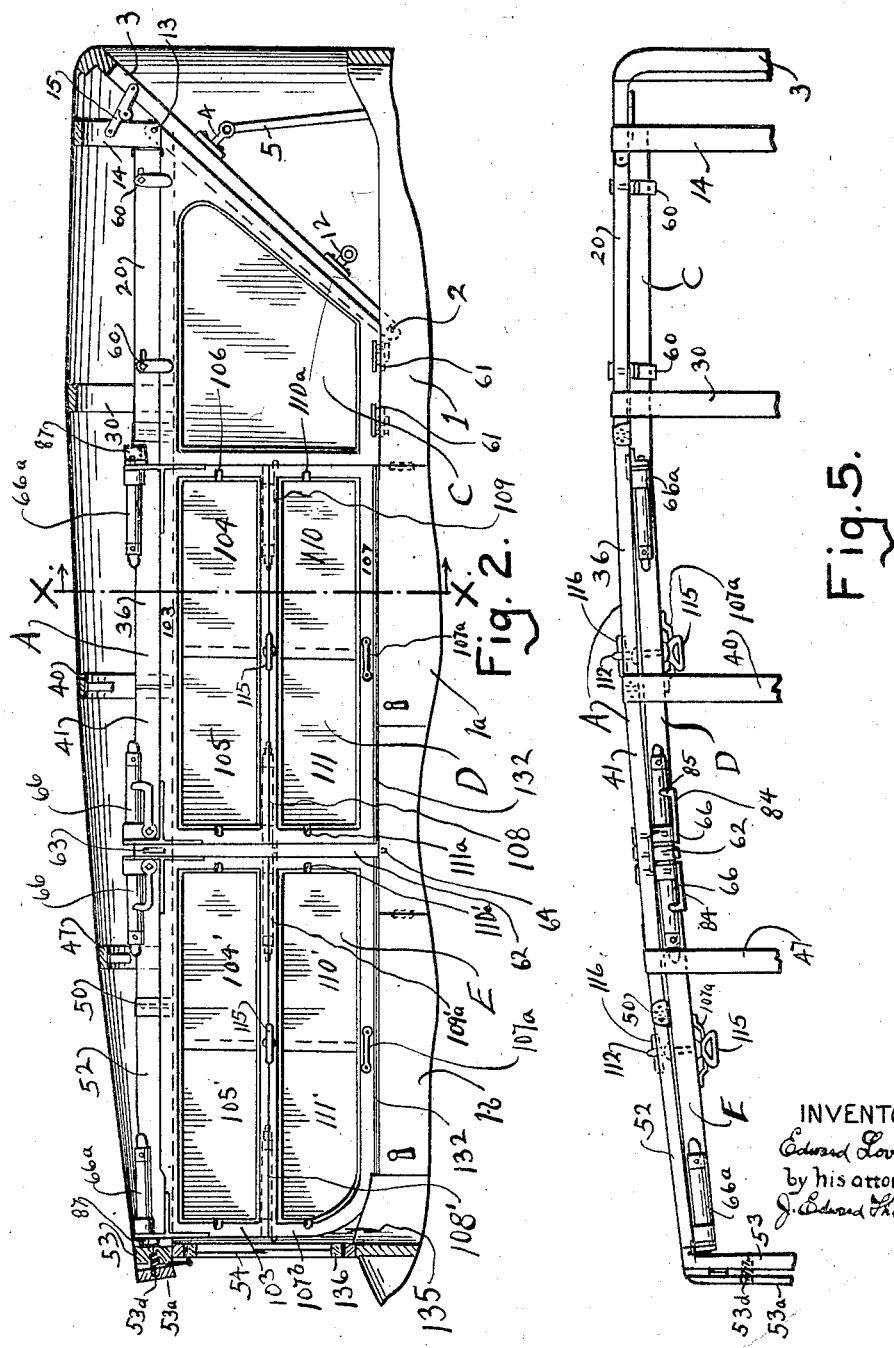

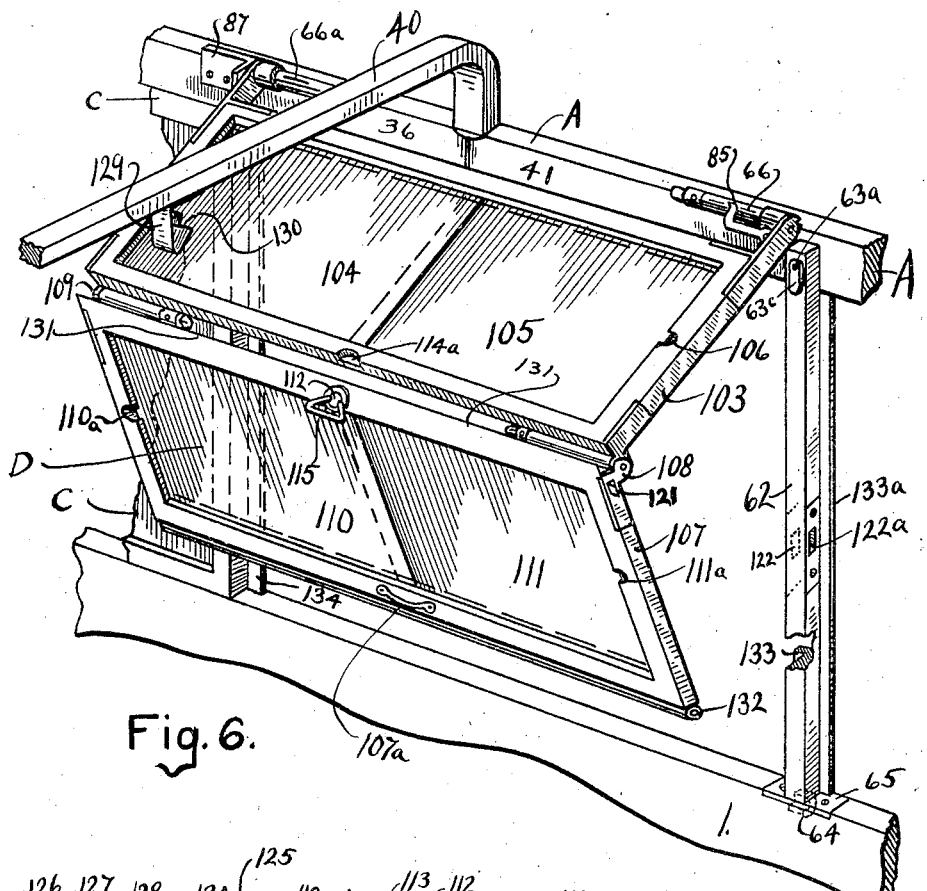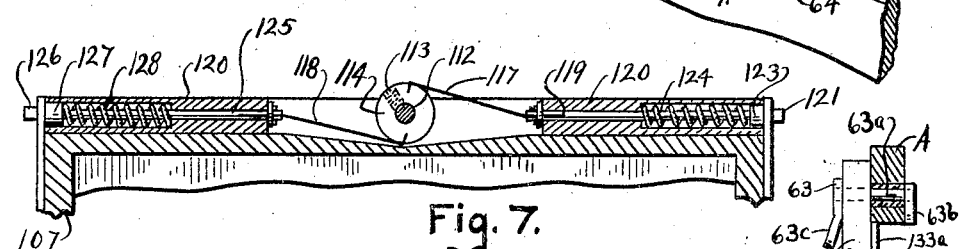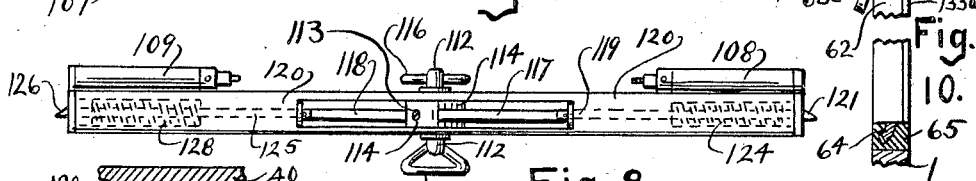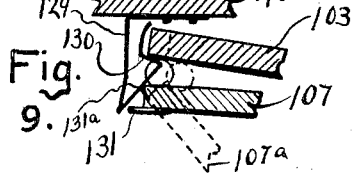

Patented Oct. 16, 1923.

1,470,689

UNITED STATES PATENT OFFICE.

EDWARD LOVER, OF BUFFALO, NEW YORK, ASSIGNOR TO LOVER TOP & CONVERTER CO. INC., OF BUFFALO, NEW YORK, A CORPORATION OF NEW YORK.

CONVERTIBLE INCLOSURE FOR VEHICLES.

Application filed April 23, 1919. Serial No. 292,158.

*To all whom it may concern:*

Be it known that I, EDWARD LOVER, a citizen of the United States, residing at Buffalo, in the county of Erie and State of New York, have invented certain new and useful Improvements in Convertible Inclosures for Vehicles; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to convertible inclosures for vehicles, including a vehicle top and releasable side walls.

One of the objects of this invention is to provide a convertible inclosure for vehicles having a collapsible top frame with side beams, to which are pivotally attached glazed wall sections, whereby said sections may be turned up within the hollow of the top frame and there secured, leaving a free space below the beams of the top frame.

A further object is to provide suitable hinges and locking devices in connection with said wall sections, adapting the same for easy manipulation in converting the inclosure for open or closed use.

A further object is to provide a releasable locking device for the wall sections, for securing them in their proper closed position, and having the locking device operable from either the interior or the exterior of the wall sections.

A further object of this invention is to provide releasable attachments for the wall sections, whereby they may be releasably attached to the top frame and the body of the vehicle without the use of tools.

A further object is to provide spring means in connection with the hinged parts of the wall sections for overcoming the weight thereof, while manipulating the same and for keeping the sections in a state of tension within their holdings on the vehicle structure, to prevent rattling and to give to the inclosure a substantial structure.

A further object is to provide a convertible inclosure for vehicles adapted to fit with the body of a standard type of vehicle, and one which will be substantial and neat in appearance.

A further object is to provide a closure having wall sections, which are more substantial in structure and appearance than the usual flimsy side curtains, used in connection with the vehicle top.

A further object is to provide glazed wall sections having the locking device operable from either the interior or the exterior wall sections.

With these and other objects in view, my invention consists in certain construction, one embodiment of which is illustrated in the drawings, is hereinafter described, the operation of the parts is explained and what I claim is set forth.

In the drawings,

Figure 1 is an exterior side view of an inclosure embodying my invention, showing the same mounted upon the body of a vehicle.

Figure 2 is a sectional interior elevation of the inclosure of the top frame shown in Figure 1.

Figure 3 is a cross sectional elevation of the assembled inclosure shown in Figures 1 and 2 looking toward the rear.

Figure 4 illustrates in fragmentary form, a top frame used with the inclosure shown in Figure 1, and here shown partly open, the construction of which is the subject of my co-pending application, filed March 14, 1919, of Serial Number 282,694.

Figure 5 is a top plan, showing a complete side including wall sections forming part of the said inclosure and as shown in Figures 1, 2 and 3.

Figure 6 is a perspective view of a hinged wall section, shown partly elevated.

Figure 7 is a sectional elevation of the upper part of the lower sash of the wall section, shown in Figure 6, illustrating the latching device for releasably holding the wall section in place, as shown in Figures 1, 2 and 3.

Figure 8 is a top plan of the sash and locking device shown in Figure 7.

Figure 9 is a sectional view of the ends of the hinged sashes of a wall section shown folded together and engaging the spring latch which is attached to one of the cross bows of the vehicle top frame.

Figure 10 illustrates a side elevation of a post separating the hinged wall sections and one mode of releasably attaching the post to the beam member of the top frame and to a side wall of the body of the vehicle.

Figure 11 is a perspective view of spring wound hinging device with attaching means for holding one end of a wall section in spring supported pivotal relation with a top beam.

Figure 12 is an elevation of a fragment of top beam with the device shown in Figure 11 attached thereto.

Figures 13 and 14 show in sectional elevation two kinds of spring wound hinging devices used at opposite ends of the top of the mid-wall section shown in Figures 1 and 2; that shown in Figure 13 being similar to that shown in Figures 11 and 12.

Figure 15 is a fragmentary perspective of the keyed end of the device shown in Figure 14.

Figure 16 is a transverse section, showing the arrangement of parts used in connection with the front cross bar for keeping the cloth deck top in a stretched condition.

Figure 17 illustrates, in section, a manually operated connection between the top beam and one of the rear wall sections.

Figure 18 illustrates, in perspective, a manually operated connection for joining the lower part of a rear wall section with the body wall.

In the figures there is shown mounted upon the vehicle body 1, a top frame having an inclined cross bow 3 pivoted at the point 2, and a front cross bar 53, releasably fixed to the wind-shield 54. This top frame is similar to the one shown and described in my co-pending application above referred to, in which two side beams, each composed of members numbered 20, 36, 41 and 52, are pivoted upon the inclined cross bow 3 and terminate in the front cross bar 53, the side beams are here lettered A and B respectively. In Figure 4 is shown the beam A partly collapsed and supporting the various cross bow fragments 14, 30, 40, 47, and 53.

In Figures 1, 2, and 3, the various parts of the inclosure and top frame are shown assembled. On each side there are three wall sections, lettered respectively C, D, and E. The rear section C is here shown releasably attached to the top beam (A or B) by means of the manually operated clamps 60, 60, shown in Figure 17, wherein the clamp 60 has a spindle $60^a$ journaled upon the bracket $60^b$, fixed upon the sash of the section C, the lever $60^d$ being fixed upon a spindle $60^a$, upon the outer end of which is fixed a tongue $60^c$, which is adapted to pass through a slot in the top beam and to turn to lock the section C to the top beam. The lower part of the section C is locked to the vehicle body wall by a similar device 61, as shown in Figure 18, wherein a bracket $61^a$ is adapted to be fixed to the lower part of the section C, and the bracket $61^b$ is adapted to be fixed to the wall of the vehicle body 1. The brackets $61^a$ and $61^b$ are locked together by the tongue $61^c$ and the lever $61^d$, which are connected integrally with a spindle portion, not here shown, but similar to the spindle $60^a$, of Figure 17. The tongue $61^c$ is adapted to pass through a slot $61^e$ in the bracket $61^b$. The section C lies against the inclined bow 3. The back covering F, the top frame, and the deck covering $53^c$, complete the inclosure to the rear of the wall sections. If desired, these sections C, C may be hinged to their respective beams A and B, and swung up out of the way and held in a manner similar to the hinging and holding of the wall sections D and E to the front thereof, which sections are hereinafter described.

Forward of the wall sections, C, C on each side of the vehicle, are the wall sections D and E, separated by a post 62, which is releasably connected with a top beam (A or B) by a manually operated locking device, similar to that shown in Figures 17 and 18. Referring to Figure 10, the clamp 63 is made up of a spindle $63^a$ passing through a slot in top beam A, and journaled in the top of the post 62, having fixed at one end of the spindle $63^a$, a tongue $63^b$, and fixed to the other end thereof, a lever $63^c$. The lower end of the post 62 is provided with a curved tongue 64, which fits a similarly curved socket in the block 65, upon the body wall 1.

Each section D and E is provided with a pair of spring wound hinging devices, which differ from one another in their manner of attachment to the top beam, but each device includes a T-bracket, one angle of which lies against an upper corner of a wall section, the opposite angle of which is open. Each of these brackets has a part extending upward, to which is attached a spring wound barrel and rod. The spring wound device marked 66, in Figure 2, is shown in detail in Figures 11, 12 and 13, wherein a rod 67 is fixed against turning in the leg 68 of the T-bracket 69. This rod 67, is surrounded by a barrel 70, between which and the rod 67 is a coiled spring 71, anchored at one end 72, in the barrel 70, and fixed at its other end 73, in a ring 74, which is provided with a set screw 75, for fixing said ring 74, against turning upon the rod 67. The ring 74 is also provided with a plurality of pockets 76, 76, adapted for receiving a tool for turning said ring 74, in winding up the spring 71. The end of the rod 67 is in threaded engagement with a cap nut 77. Referring particularly to Figures 11 and 12, the barrel 70 is shown having integral therewith a metal loop 78, having legs 79, and 80, in which is journaled the spindle 81, which has fixed on one end thereof, a tongue 82, spaced from the leg 80, by the spacer 83. The opposite end of the spindle 81, has fixed thereto, a lever 84 which has an angular projection 85 adapted for frictional engagement with the barrel 70. In Figure 12, there is shown a slot 86, in the top beam A, through which is passed the tongue 82, when attaching or detaching the hinging device to the top frame.

The opposite end of the section D is provided with a hinging device 66$^a$ which is shown in section in Figure 14. To releasably attach the device 66$^a$ to the top beam A, there is provided an angular bracket 87, fixed to the top beam A and having a square hole at 88, which is engaged in sliding keyed relation by the square end 89, of the rod 90. As shown in perspective in Figure 15, for the opened position of the wall section, a tongue 91 bears against a shoulder 92, of the barrel 93; there being an angular space for the play of the tongue 91 between the shoulders 92 and 92$^a$. The T-bracket 94, which is part of the hinging device, has integral therewith, the barrel 93. Between the barrel 93, and the rod 90, is a spring 96, anchored at 97 to the barrel 93, and anchored at 98 to the ring 99, which is free to turn upon the rod 90, except when held thereto by the set screw 100, the ring 99, is provided with a plurality of pockets 101, for the use of a tool in winding the spring 96. The end of the rod 90 has threaded thereto the cap nut 102.

The wall sections D and E are each composed of an upper and a lower sash, centrally hinged together. The section D is illustrated in detail, with its mounting in Figure 6, wherein the sash 103 has fixed at its upper end the hinging devices 66 and 66$^a$ above described. The sash 103 is provided with two slidable panes of glass 104, 105. A recess 106 is provided at each end of the sash 103, on the inside, for the purpose of reaching the edges of the glass panes, when opening the same. The lower sash 107, of the wall section D is hinged to the upper sash 103 by means of the hinging devices 108 and 109, which contain coiled springs for the purpose of keeping an angular spring tension between the upper and lower sashes in a condition of impending folding together of said sashes. The lower sash 107, is provided with two panes of glass 110, 111, slidable therein; which is provided with notches 110$^a$, 111$^a$, for the purpose of reaching the edges of the window pane on opening the same. There is also provided with the sash 107, a handle 107$^a$ fixed thereto. In the upper part of the sash 107 is a latching device shown in detail in Figures 7 and 8, wherein a short rod 112 is journaled and has fixed thereto by means of the set screw 113 a disk 114. One end of the rod 112 has fixed thereto a stiff handle 115, on the inside of the car. Pivoted to the outer end of the rod 112, is the handle 116. To the disk 114, are attached two flexible handle strips 117, and 118. The strip 117, is fixed to a rod 119, which is in sliding engagement with the casing 120, of the latching device. The rod 119 terminates externally in the beveled tongue 121, adapted for engagement with the recess 122, similar to the recess 122$^a$ on the opposite side of the post 62. The rod 119, has integral therewith a flange 123, between which and a wall of the casing 120, is a compression spring 124, which normally keeps the tongue 121 outward. The strip 118 is fixed to a rod 125, which is in sliding engagement with the casing 120, of the latching device. The tongue 126, at the end of the rod 125, a flange 127, and the spring 128, are similar respectively, to the tongue 121, the flange 123, and spring 124 above described. The spring 128, acts to keep the tongue 126 normally outward. Referring again to Figure 6, there is shown connected with the top beam A, the cross bow 40, upon which is fixed the spring clip 129, shown enlarged in Figure 9 wherein the sash 103, is shown engaging the ledge 130, of the clip 129. The sash 107 is here shown folded with the sash 103 and has the lip 131 nearly in contact with the clip 129. The full length of the lower edge of the sash 107 is provided with a rubber cushion 132.

The post 62 is provided with a stop 133, and wall section C is provided with a stop 134, against which the wall section D is crowded, when the same is closed down, having the cushion 132 in forced contact with the upper edge of the wall of the body 1.

The wall section E is similarly provided with hinging devices etc., to that described for the section D. But the lower sash 107$^b$ has its lower front corner curved to fit against an adapting piece 135, which fits in between the windshield post 136, and the section E; the proper window stops as 133$^a$ being provided. This adapting piece can be dispensed with by providing a windshield post of the proper contour to fit the front edge of the front end of the wall section E.

Referring now to the deck stretching device, there is shown in Figure 16, a cross bar 53$^a$ connected by the hinge 53$^b$, to the cross piece 53 of the top frame. The cloth 53$^c$, of the deck is fixed to the cross bar 53$^a$, and 53$^a$ is spring pressed from the cross bar 53, by means of springs 53$^d$, 53$^d$, which enter pockets 53$^e$, 53$^e$, in the cross bar 53$^a$, each of which is engaged by a stud 53$^f$, which is in threaded engagement with the plate 53$^g$. The stud 53$^f$ is provided with the flange 53$^h$, integral therewith and in contact with the spring 53.

In operating the convertible inclosure herein illustrated and above described, let us first assume that the top frame parts between the frame connection at the point 2 and the windshield 54, are all in extended position as shown in Figures 1 and 2, having the side beams A and B in fixed position and the parts thereof in line as also shown in the plan in Figure 5, and it is desired on account of weather conditions to put on the wall sections, as we would put on curtains in the old way. Each section C is then positioned as shown in Figures 1 and 2. The lower part of the section C is attached resting on top of the wall of the body 1, by means of the clamping devices 61, 61, shown in detail in Figure 18. The tongue 61ᶜ is passed through a slot in the part 61ᵇ and is turned as shown to hold the parts of the clamping device together. The clamps 60, 60 are next set by passing the tongue 60ᶜ of each through a slot in the top beam A or B, as the case may be, and the lever 60ᵈ is turned down as shown in Figures 17 and 2, to hold the section C up against the top beam. Having thus set each section C in its place, a post 62, on each side of the car is next positioned and locked there, as shown in Figures 6 and 10.

The parts 135, 135 are next set in place adjoining the windshield 54, as shown in Figure 2. Next the springs of the hinging devices 66 and 66ᵃ are wound and set at the proper resistance, and the sections D and E are hung therewith having the tongues 82 of the devices 66 and the square ends 89 of the devices 66ᵃ in their proper places in and on the beams A and B.

Having described my invention, I claim,

1. In a convertible inclosure, adapted for attachment to the body of a vehicle, the combination with a top frame having a beam, of a wall section, and a releasable hinging device pivotally attaching said section to said beam, said device comprising a bracket attached to said section, a casing pivotally connected with said bracket, and a locking member having a tongue attached thereto, a lever positioned on said bracket, said tongue being spaced from said bracket and adapted to pass through a slot in said beam, to be turned across a lip of said slot to hold said beam between said tongue and said bracket.

2. A hinging device adapted to pivotally attach a sash to a frame, comprising a bracket attached to said frame, a casing pivotally connected with said frame, a rod within said casing fixed thereto, a spring wound about said rod, within said casing and attached to said casing, a ring adapted to turn on said rod, said ring being attached to said spring, means for adjustably fixing said ring on said rod, and a locking member journaled on said casing comprising a spindle journaled on said casing, a lever fixed to one end of said spindle and a tongue projecting at an angle from the other end of said rod and spaced from said casing, whereby said tongue may pass through a slot in said frame and be turned to hold said frame between said casing and itself.

EDWARD LOVER.